(12) United States Patent
Yoshida et al.

(10) Patent No.: US 6,471,251 B1
(45) Date of Patent: Oct. 29, 2002

(54) SPIRALLY CORRUGATED PIPE ELBOW AND METHOD FOR MANUFACTURING SAME

(75) Inventors: Tatsushi Yoshida; Kimihiro Egoshi, both of Osaka (JP)

(73) Assignee: Totaku Industries, Inc., Osaka (JP)

( * ) Notice: Subject to any disclaimer, the term of this patent is extended or adjusted under 35 U.S.C. 154(b) by 47 days.

(21) Appl. No.: 09/669,848

(22) Filed: Sep. 27, 2000

(30) Foreign Application Priority Data

Sep. 28, 1999 (JP) .......................................... 11-275175

(51) Int. Cl.⁷ ................................................ F16L 43/00
(52) U.S. Cl. ........................ 285/179; 285/423; 285/183; 285/903
(58) Field of Search ............................. 285/179, 179.1, 285/183, 423, 424, 903; 29/890.149

(56) References Cited

U.S. PATENT DOCUMENTS

| | | | | |
|---|---|---|---|---|
| 113,614 A | * | 4/1871 | Austin et al. ................ | 285/183 |
| 119,621 A | * | 10/1871 | Leas et al. ................... | 285/183 |
| 127,583 A | * | 6/1872 | Dieckmann ................. | 285/183 |
| 164,872 A | * | 6/1875 | Piehl .......................... | 285/183 |
| 296,786 A | * | 4/1884 | Rock ..................... | 29/890.149 |
| 313,858 A | * | 3/1885 | Evans et al. ................. | 285/183 |
| 853,580 A | * | 5/1907 | Foster ......................... | 285/179 |
| 1,066,223 A | * | 7/1913 | Rendchen .............. | 29/890.149 |
| 2,147,431 A | * | 2/1939 | Ewing ......................... | 285/179 |
| 3,977,706 A | * | 8/1976 | Schneider ................... | 285/179 |
| 3,979,809 A | * | 9/1976 | Schneider ............. | 29/890.149 |
| 4,106,797 A | * | 8/1978 | Michael ...................... | 285/423 |
| 6,227,578 B1 | * | 5/2001 | Fukui et al. ................ | 285/179 |

\* cited by examiner

*Primary Examiner*—Eric K. Nicholson
(74) *Attorney, Agent, or Firm*—McGinn & Gibb, PLLC

(57) ABSTRACT

A spirally corrugated pipe elbow according to the present invention is constructed in such a manner that after a bend forming portion of a pipe body P having a given length and including a spirally corrugated pipe wall 1, with a partial portion a of the pipe wall 1 existing in the peripheral direction of the pipe body P left uncut, is cut and removed from the pipe body P in the form of a cut portion having a substantially V-like shape when it is viewed from the side surface side thereof, the thus obtained two cut surfaces are then bent and contacted with each other with the uncut pipe wall portion a set on the large diameter side, and the thus contacted portions t are connected together in a watertight manner using connecting material m. Accordingly, it is possible to provide an elbow having a structure free from the above water leakage and a method capable of manufacturing such elbow easily and quickly.

8 Claims, 16 Drawing Sheets

Prior Art

Prior Art

Prior Art

Prior Art

Prior Art

Prior Art

SPIRALLY CORRUGATED PIPE ELBOW AND METHOD FOR MANUFACTURING SAME

BACKGROUND OF THE INVENTION

The present invention relates to an elbow which can be suitably connected mainly to the bent piping portions of pipe bodies, and a method for manufacturing the same elbow. Although the present invention does not relate directly to the sizes of the diameters of pipe bodies, the present invention particularly relates to an elbow which is suitably connected mainly to the bent piping portions of large-sized pipe bodies having a large inside diameter, for example 1,000 mm, 2,000 mm and so on.

Conventionally, in an elbow of the above type and a method for manufacturing the same, as shown in FIGS. 11 to 16, a synthetic resin pipe body P having a required length and including a spirally corrugated pipe wall 1 is cut and divided along a cut line C having a required inclination angle in the inclined direction thereof to thereby produce two pipe bodies, one of the thus cut and divided two pipe bodies is turned in the circumferential direction of the pipe body P with respect to the other to thereby change the relative angles of the cut surfaces of the pipe body, and the cut end faces of the two pipe bodies are butted against each other and are then connected together in a watertight manner. (For example, refer Japanese Patent Examined Publication No. Hei. 4-44157, especially, a structure shown in FIG. 1 thereof).

Describing the above structure more concretely with reference to the accompanying drawings, to manufacture an elbow E having an angle of 45° shown in FIG. 13, as shown in FIG. 11, the middle portion of a blank material, that is, a spirally corrugated synthetic resin pipe body P, which has been cut to a required length, is cut and divided along a cut line C inclined at an angle of 22.5° with respect to an intersection line in the longitudinal direction thereof to thereby provide two pipe bodies p, p'. Next, of the thus divided two pipe bodies p, p', one pipe body p'(in the case of FIG. 12, a pipe body shown on the right side thereof) is turned by an angle of 180° in the circumferential direction thereof to change the relative angles of the cut surfaces of the pipe bodies p, p' in such a manner that the cut surfaces of the two divided pipe bodies p, p' can have a V-like shape when it is viewed from the side surface side thereof; next, the respective cut end faces of the two pipe bodies p, p' are butted against each other (FIG. 12); the whole peripheries of the thus butted surfaces F are connected together by wire members w such as wires which are disposed at two or more portions of the butted surfaces F so as to extend across the two sides of the respective butted surfaces F; a sheet-shaped connecting material g formed of blank material, which has the same property as the material of the pipe body P and is highly fusion-weldable to the pipe body P material, is heated and melted and is then stuck onto the outer peripheries of the thus-connected butted surfaces F in several layers, thereby closing or sealing spaces formed on the spirally corrugated cut surfaces of the butted surfaces F over the whole peripheries of the pipe bodies; and, the inner surface sides of the pipe bodies are also sealed similarly to thereby connect together the two pipe bodies p, p' in a watertight manner. That is, the elbow E is manufactured in this manner.

Now, FIGS. 14 to 16 show means for manufacturing an elbow E having a bending angle of 90° shown in FIG. 16. As shown in FIG. 14, a blank material, that is, a synthetic resin pipe body P is cut on the two sides of the middle portion of the pipe body P along cut lines C, C respectively inclined at an angle of 22.5° and at an angle of −22.5° with respect to an intersection line in the longitudinal direction of the pipe body P; with the thus obtained middle portion pipe body p' left unchanged as it is, the two-side pipe bodies p, p are respectively turned by an angle of 180° in the circumferential direction thereof to thereby change the relative angles of their respective cut surfaces; next, the thus angle-changed cut surfaces are butted against each other (FIG. 15); and, the respective butted surfaces F, F are connected together in a watertight manner using similar means to the above-mentioned case, thereby manufacturing the elbow E.

Also, in place of the above-mentioned sheet-shaped connecting material, there is also used means in which glass fiber sheets are stuck on the outer peripheries of the butted surfaces F, F in several layers using fused resin.

As described above, in the conventional spirally corrugated pipe elbow E of this type, there is employed the above means that spirally corrugated pipe body is cut at a required angle to two pipe bodies, one of the two divided pipe bodies is turned 180° with respect to the other to change the respective angles of the cut surfaces of the two pipe bodies, the cut surfaces of the two pipe bodies are then butted against each other, and the thus butted surfaces of the two pipe bodies are connected together in a watertight manner over the whole peripheries thereof. However, this means raises a problem that it requires great trouble and time as well as a skilled technique; and, this means also raises another problem that the mutually butted surfaces of the two pipe bodies, including large spaces produced between the butted surfaces due to the mutual deviations between the spirally corrugated portions of the two pipe bodies, must be positively closed over the entire peripheries thereof and thus must be connected together in a watertight manner. Also, in the conventional spirally corrugated pipe elbow E, there is found a further problem that, even in case where the elbow E is manufactured with the great time and trouble taken, the connected portions of the elbow E obtained over the whole periphery thereof can be damaged in part due to vibrations produced during delivery of the elbow E, or due to improper handling of the elbow E, or due to biased loads such as uneven ground pressures applied to the elbow E after it is embedded into the ground, which gives rise to easy leakage of water.

SUMMARY OF THE INVENTION

In view of the above, the present invention aims at reducing and solving the above-mentioned problems found in the conventional elbow and in the conventional method for manufacturing the same. Accordingly, it is an object of the invention to provide an elbow having a structure free from the above water leakage and a method capable of manufacturing such elbow easily and quickly.

In attaining the above object, according to a first aspect of the invention, there is provided a first structure for an elbow. Referring to the first structure using reference characters used in the below-mentioned preferred embodiments of the invention, after a bend forming portion of a pipe body P having a given length and including a spirally corrugated pipe wall 1, with a partial portion a of the pipe wall 1 existing in the peripheral direction of the pipe body P left uncut, is cut and removed from the pipe body P in the form of a cut portion having a substantially V-like shape when it is viewed from the side surface side thereof, the thus obtained two cut surfaces are then bent and contacted with each other with the uncut pipe wall portion a set on the large diameter side, and the thus contacted portions t are connected together in a watertight manner using connecting material m.

Also, in the case of a second structure according to the invention, a bend forming portion of a pipe body P having a given length and including a spirally corrugated pipe wall 1, with a partial portion a of the pipe wall 1 existing in the peripheral direction of the pipe body P left uncut, is cut and removed from the pipe body P in the form of a cut portion having a substantially V-like shape when it is viewed from the side surface side thereof, and the mutually opposing cut bottom portions (e), (e) of the V-shaped cut portion are cut and removed in such a manner that they are shifted substantially by one pitch width r of the spirally corrugated shape of the pipe wall 1 in the axial direction of the pipe body P; and, after then, the thus obtained cut surfaces are bent and contacted with each other with the uncut pipe wall portion a set on the large diameter side, the crown portions 2 of the spirally corrugated shapes of the cut surfaces are contacted with each other substantially in a mutually opposing manner and the valley portions 3 of the spirally corrugated shapes of the cut surfaces are also contacted with each other substantially in a mutually opposing manner, and the outer peripheral surfaces of the contact portions t are connected together in a watertight manner using connecting material m.

And, according to another aspect of the invention, there is provided a method for manufacturing an elbow having the above-mentioned first structure. The present elbow manufacturing method executes sequentially the following steps of: cutting and removing a bend forming portion of a pipe body P having a given short length and including a spirally corrugated pipe wall 1 from the pipe body P in the form of a cut portion having a V-like shape when it is viewed from the side surface side thereof, while a partial portion a of the pipe wall 1 existing in the peripheral direction of the pipe body P is left uncut; bending the two side portions of the pipe body P with the uncut pipe wall portion a set on the large diameter side, and then contacting the cut surfaces (c), (c) with each other; and, while maintaining the bent state, connecting together the outer peripheral surfaces of the contact portions t of the cut surfaces c, c in a watertight manner using connecting material m.

Further, according to a further aspect of the invention, there is provided a method for manufacturing an elbow having the above-mentioned second structure. The present elbow manufacturing method executes sequentially the following steps of: cutting a bend forming portion of a pipe body P having a given short length and including a spirally corrugated pipe wall 1 from the pipe body P in the form of a cut portion having a V-like shape when it is viewed from a side surface side thereof, while a partial portion a of the pipe wall 1 existing in the peripheral direction of the pipe body P is left uncut, in such a manner that the mutually opposing cut bottom portions e, e of the V-shaped cut portion are shifted substantially by one pitch width r of the spirally corrugated shape of the pipe wall 1 in the axial direction of the pipe body P; removing the cut portion 4; bending the two side portions of the pipe body P respectively existing on the two sides of the uncut pipe wall portion a with the uncut pipe wall portion a set on the large diameter side to thereby substantially match the crown portions (2) of the spiral corrugated shapes of the cut surfaces to each other as well as substantially match the valley portions 3 thereof to each other, and then contacting the cut surfaces c, c with each other; and, while maintaining the above bent state, connecting together the outer peripheral surfaces of the contact portions t of the cut surfaces c, c in a watertight manner using connecting material m.

When enforcing the above-structured elbow, from the viewpoint of the pipe wall structure of a pipe body used as a blank member, there may be used a pipe body having a single wall structure formed in a spirally corrugated shape, or a pipe body having a dual wall structure including a corrugated main wall and an inner wall provided inside the main wall; or, in case where a pipe body to be connected to the present elbow is of a type that it is inserted into and connected to the interior portion of the elbow, there may be used a pipe body structured such that its outer periphery is formed in a smooth wall and its interior portion is formed in a spirally corrugated shape. Also, while the synthetic resin blank material of the pipe body is not limited to specific resin, preferably, there may be used blank material which is highly waterproof and weatherproof, such as polyolefin-system resin or vinyl chloride resin.

As the connecting means for connecting together the contact portions t, resin blank material having the same properties as the pipe body forming blank material or resin blank material highly fusion-weldable to the pipe body forming blank material may be applied to the contact portions t in such a state that it is heated and melted, or adhesives may be applied to the contact portions t, or sheet-shaped blank member may be attached to the contact portions t using the above-mentioned fusion-weldable resin or adhesives. Also, preferably, these connecting blank materials may be highly waterproof or weatherproof.

DETAILED DESCRIPTION OF THE PREFERRED EMBODIMENTS

Figure 1:
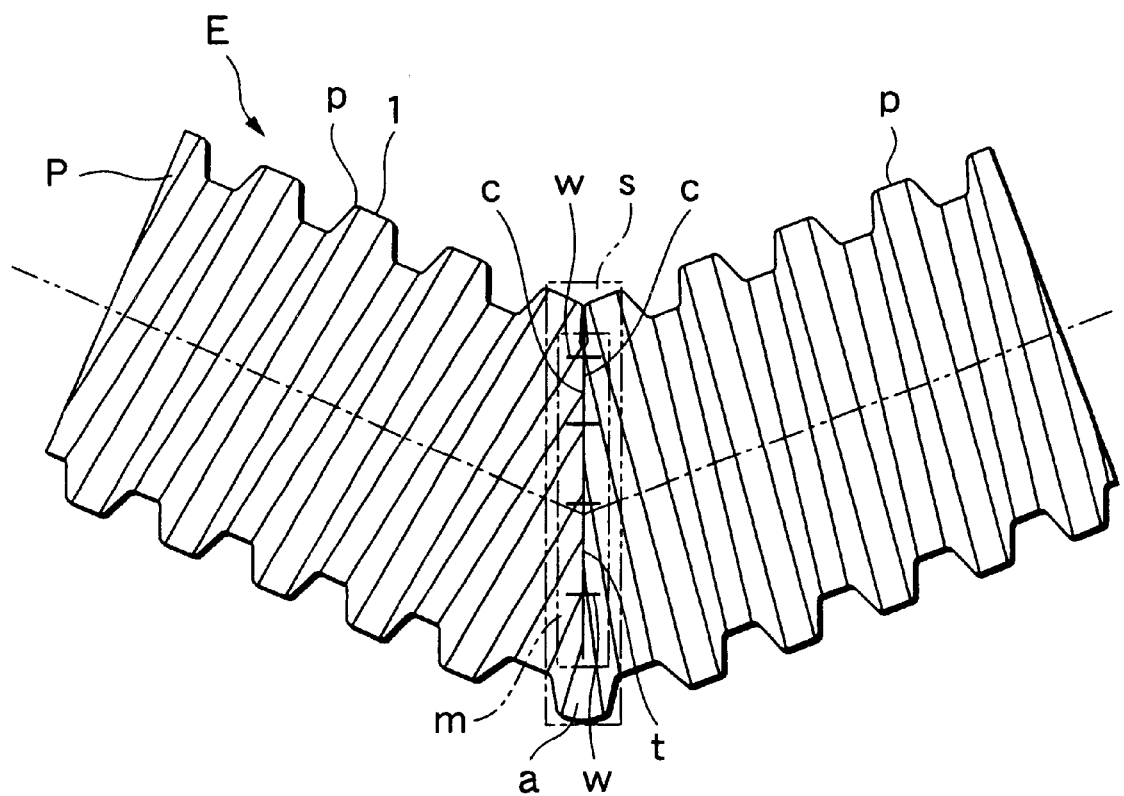
FIG. 1 is a side view of an elbow according to a first embodiment of the invention.
Figure 2:
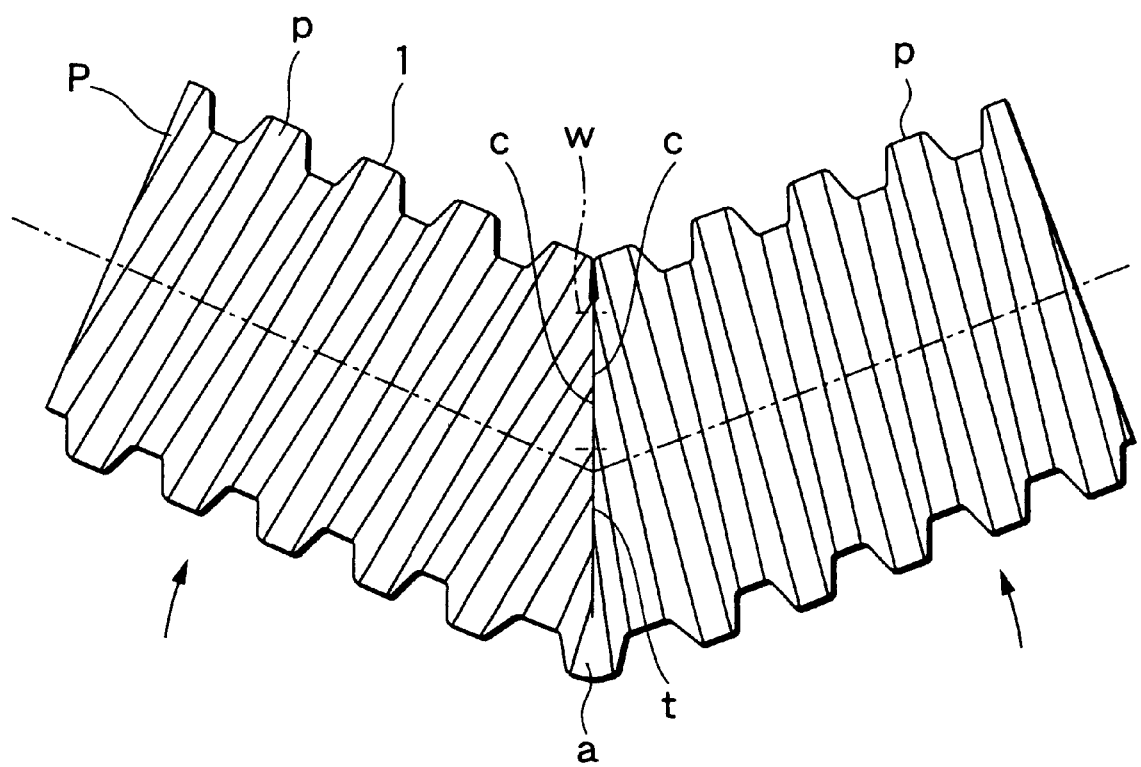
FIG. 2 is a side view of the elbow shown in FIG. 1, showing a state thereof in which it is under manufacture.
Figure 3:
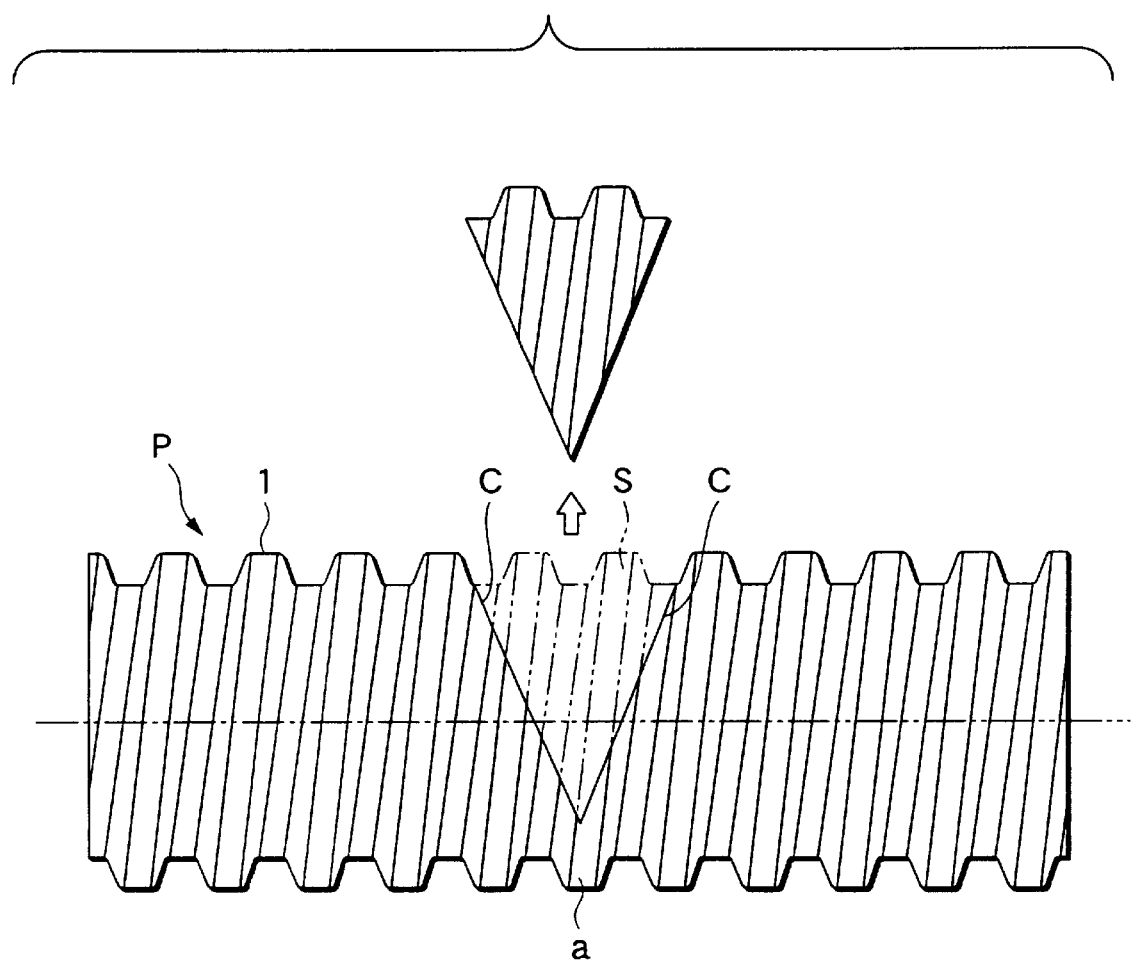
FIG. 3 is a side view of the elbow shown in FIG. 1, showing an initial stage of manufacturing the elbow.

Now, description will be given below of the preferred embodiments of a spirally corrugated elbow according to the invention with reference to the accompanying drawings. Of the accompanying drawings, FIGS. 1 to 3 show a first embodiment of a spirally corrugated elbow according to the invention. In detail, FIG. 1 shows a completed state of the elbow, FIG. 2 shows a state of the elbow under manufacture on the way to completion, and FIG. 3 shows a pipe body 1 used as a blank member for manufacturing the elbow as well as a first step of manufacturing the elbow.

For the sake of convenience of explanation, description will be firstly given of a method for manufacturing the elbow. An elbow E according to the first embodiment of the invention shown in FIG. 1 is suitable for use with a pipe body having a relatively large inside diameter, for example, 1,000 mm or 2,000 mm, can stand large internal and external pressures, and has a bending angle of 45°. In the case of the elbow E, a pipe body, which is formed of polyethylene resin blank material and includes a single wall structure having a spirally corrugated pipe wall 1, as shown in FIG. 3, is cut to a given length, thereby providing a blank member P for formation of an elbow.

At first, the bend forming portion of the pipe wall 1 of the pipe blank member P, here, the longitudinal-direction middle portion of the pipe wall 1 of the pipe blank member P, as shown in FIG. 3, is cut along V-shaped cut lines C, C respectively inclined substantially at angles of 22.5° and −22.5° with respect to the longitudinal-direction intersection line of the pipe wall 1 with a portion a of the pipe wall 1 in the pipe peripheral direction thereof (in FIG. 3, a portion shown on the lower side) left uncut, thereby providing a cut portion having a V-like shape when it is viewed from the side surface side thereof, and this cut portion is removed in such a manner as shown by an arrow mark in FIG. 3 to thereby form a V-shaped cut space S which is shown by virtual lines in FIG. 3.

Next, as shown in FIG. 2, the pipe body P is bent upwardly with the pipe wall uncut portion a (in FIG. 2, the lower portion) set on the large diameter side thereof in such a manner that the cut surfaces c, c of the resultant two pipe body portions p, p respectively existing on the two sides of the uncut portion a can be contacted with each other. After then, while maintaining this bent state, the contact portions t of the cut surfaces c, c are fastened tight using a wire member, which is shown by a virtual line w in FIG. 1, including a metal wire such as an iron wire, a stainless steel wire, or a copper wire, or a rust resisting plated metal wire or a rust resisting resin covered metal wire, or a resin mono-filament wire or a resin twisted wire, or a natural fiber twisted wire, or using a string-shaped blank member, thereby maintaining the bent state of the pipe body P positively.

In the case of a pipe body having an inside diameter of the order of 500 mm, this tightening may be enforced only in one portion that is opposed to the pipe wall uncut portion a. However, in the case of the elbow E according to the present embodiment, as shown in FIG. 1, the contact portions t maybe tightened at several proper positions to thereby stabilize the bent state of the pipe body P. However, such tightening by the above wire member is not necessary in all elbows; that is, in the case of a pipe blank member having a small thickness and a small diameter, such tightening means can also be omitted.

After then, the pipe wall portion around the contact portions t including the wire member is heated using a gas burner; while the pipe wall portion is being heated, thermally melted resin as a connecting blank material m is pushed out from a nozzle of a heated resin extruding machine such as a resin extruding gun and is sequentially applied onto the upper surface of such pipe wall portion closely and positively with no space left thereon, thereby connecting together the two pipe body portions p, p in a watertight manner.

In the case of the elbow E according to the present embodiment, the connecting blank material m is shown in FIG. 1 in such a manner that it is applied only onto the outer peripheral portions of, the contact portions t. However, the connecting blank material m may also be applied not only onto the outer peripheral portions of the contact portions t but also onto the entire peripheries of the contact portions t including the outer peripheral surface portion of the pipe wall uncut portion a.

Also, according to the present embodiment, as shown in FIG. 1, another coating blank material s, that is, FRP is applied in a dual-film manner over the entire pipe-periphery-direction periphery of not only the whole outer peripheral surface of the connecting blank material m coated surface but also the whole outer peripheral surface of the pipe wall uncut portion a.

Note that a suitable coating width of the coating raw material s is selected in accordance with needs.

In the thus manufactured elbow E, as can be seen from FIG. 1, the pipe body P having a given length and including the spirally corrugated pipe wall 1 is bent formed substantially in the axial-direction middle portion thereof; in the bend formed portion, after a portion of the pipe wall 1 of the pipe body P, with the pipe-circumferential-direction portion a, that is, a portion shown on the lower side in FIG. 1 left uncut, is cut and removed in the form of a cut portion having a substantially V-like shape when it is viewed from the side surface side thereof, the resultant cut surfaces c, c are bent and contacted with each other with the pipe wall uncut portion a set on the large diameter side in such a manner that they cooperate together in forming a V shape having an angle of approx. 45°;; and, the contact portions t of the cut surfaces c, c are connected together in a watertight manner by the connecting material m.

Figure 4:
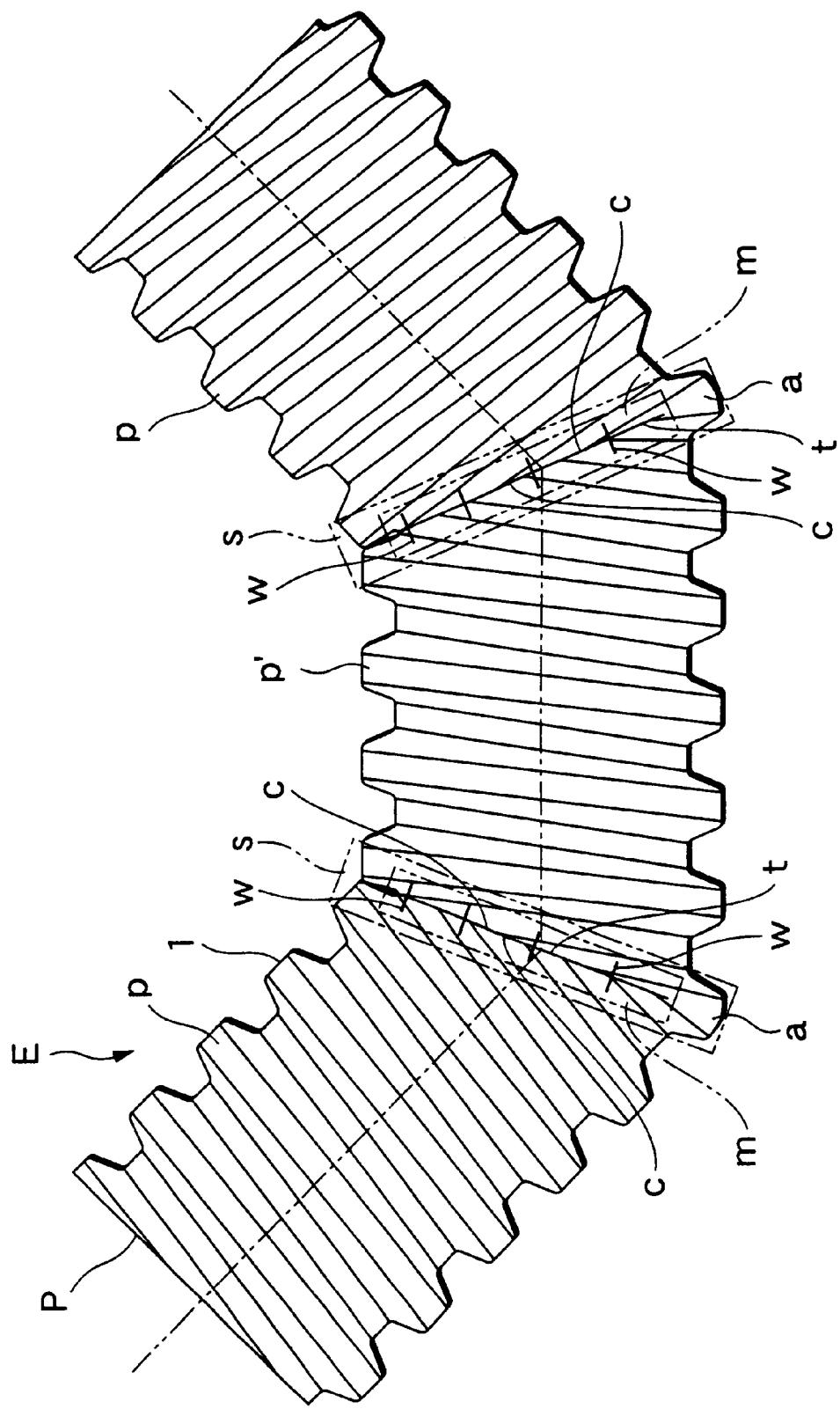
FIG. 4 is a side view of an elbow according to a second embodiment of the invention.
Figure 5:
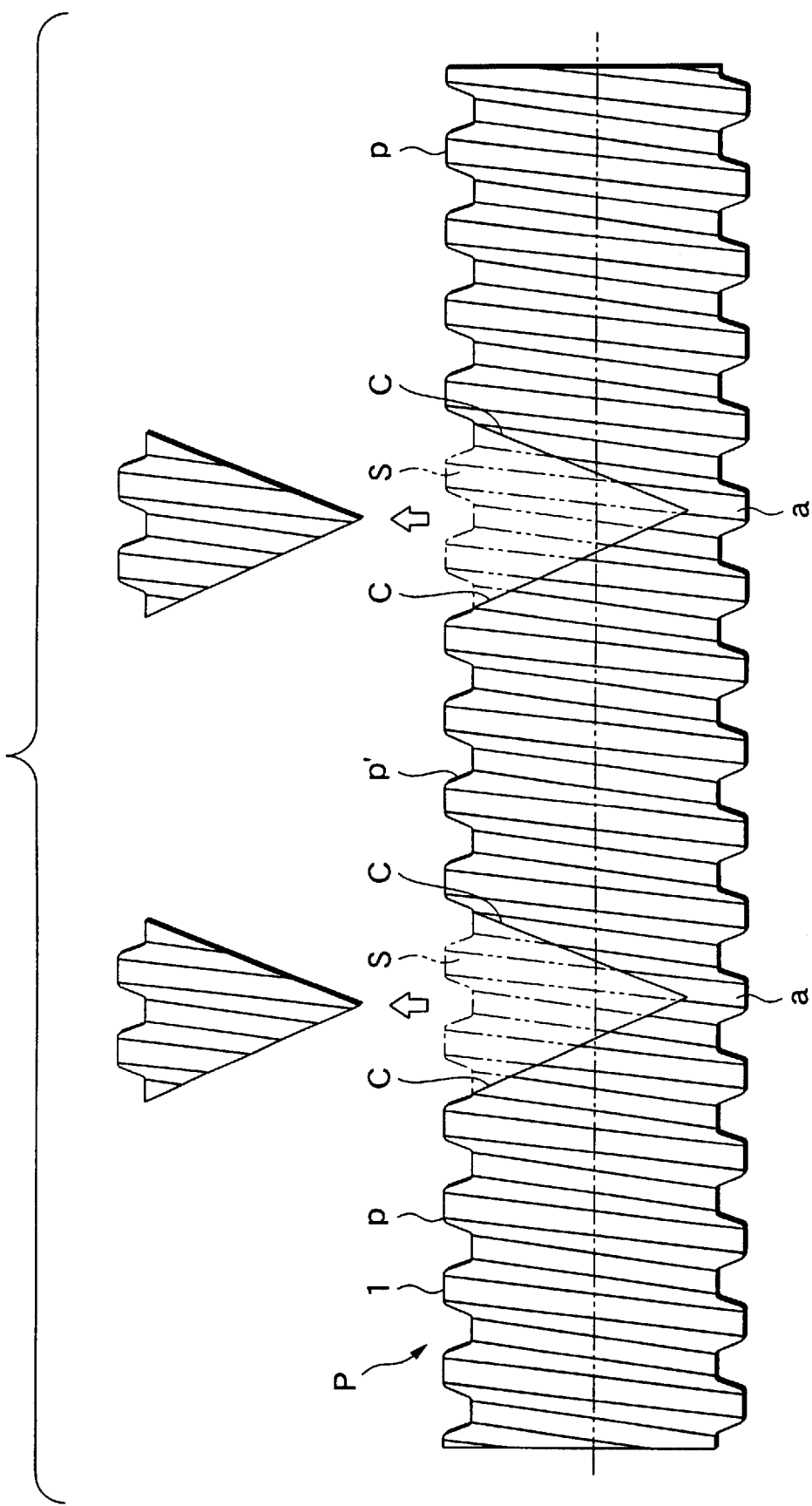
FIG. 5 is a side view of the portion of the second embodiment that corresponds to FIG. 3.

Now, FIG. 4 shows a second embodiment of an elbow according to the invention. This elbow E is different from the elbow E according to the previously described first embodiment shown in FIG. 1. That is, as shown in FIG. 5, the two portions of a pipe body P, which are spaced from each other at a given distance in the axial direction of the pipe body P, are cut and removed respectively by an angle of approx. 45°, by means similar to that employed in the previously described first embodiment, in the form of cut portions each having a substantially V-like shape when it is viewed from the side surface side thereof while their respective pipe-circumferential-direction partial portions a, a (in FIG. 5, the respective lower partial portions of the two portions) are left uncut; the thus formed two side pipe body portions p, p with the central pipe body portion p' between them are respectively bent by an angle of approx. 45° with the above-mentioned uncut pipe wall portions a, a respectively set on the large diameter side thereof; and, the contact portions t, t of the cut surfaces, similarly to the first embodiment, are connected together in a watertight manner by connecting material m, thereby providing an elbow having a bending angle of 90°.

Next, description will be given below of a method for manufacturing an elbow according to the second embodiment that is a modification of the first embodiment, that is, an elbow E structured such that, in the elbow E according to the above-mentioned second embodiment, not only the crown portions 2, 2 of the spirally corrugated shapes of the above-mentioned cut surfaces are connected together substantially in a mutually opposing manner but also the valley portions 3, 3 thereof are connected together substantially in a mutually opposing manner.

Figure 6:
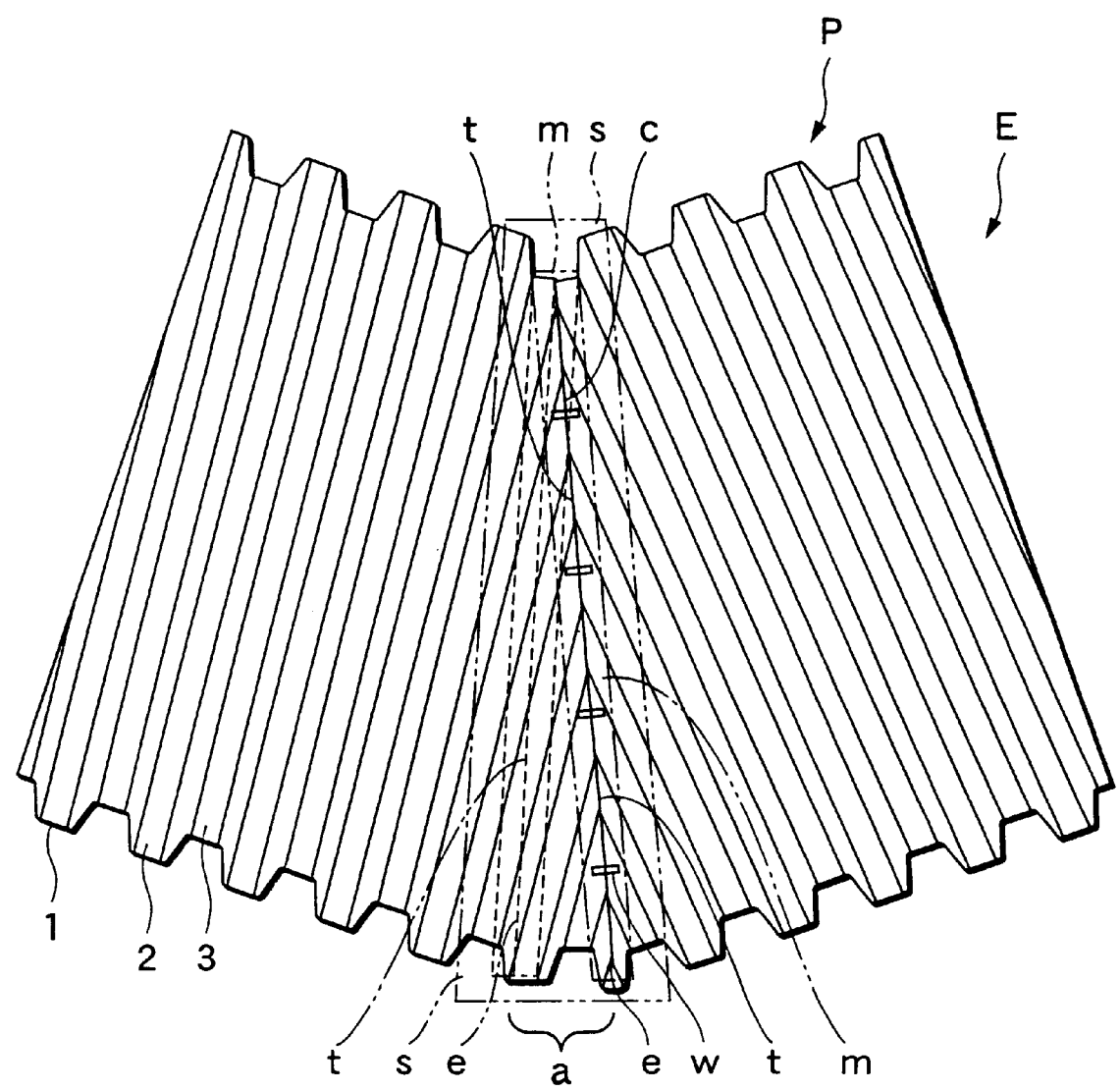
FIG. 6 is a side view of an elbow according to a modification of the second embodiment.
Figure 7:
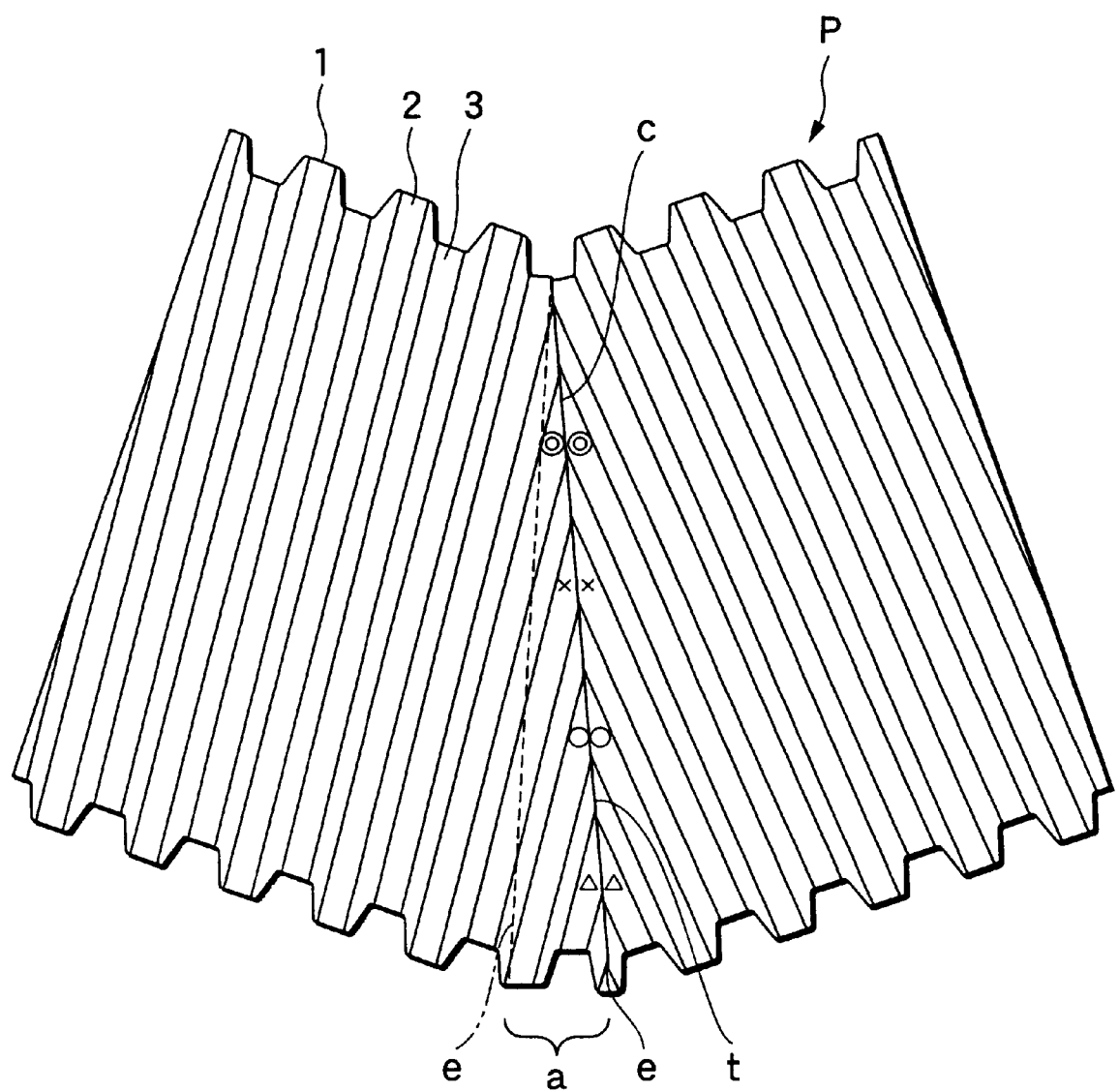
FIG. 7 is a side view of the elbow shown in FIG. 6, showing a state thereof in which it is under manufacture.
Figure 8:
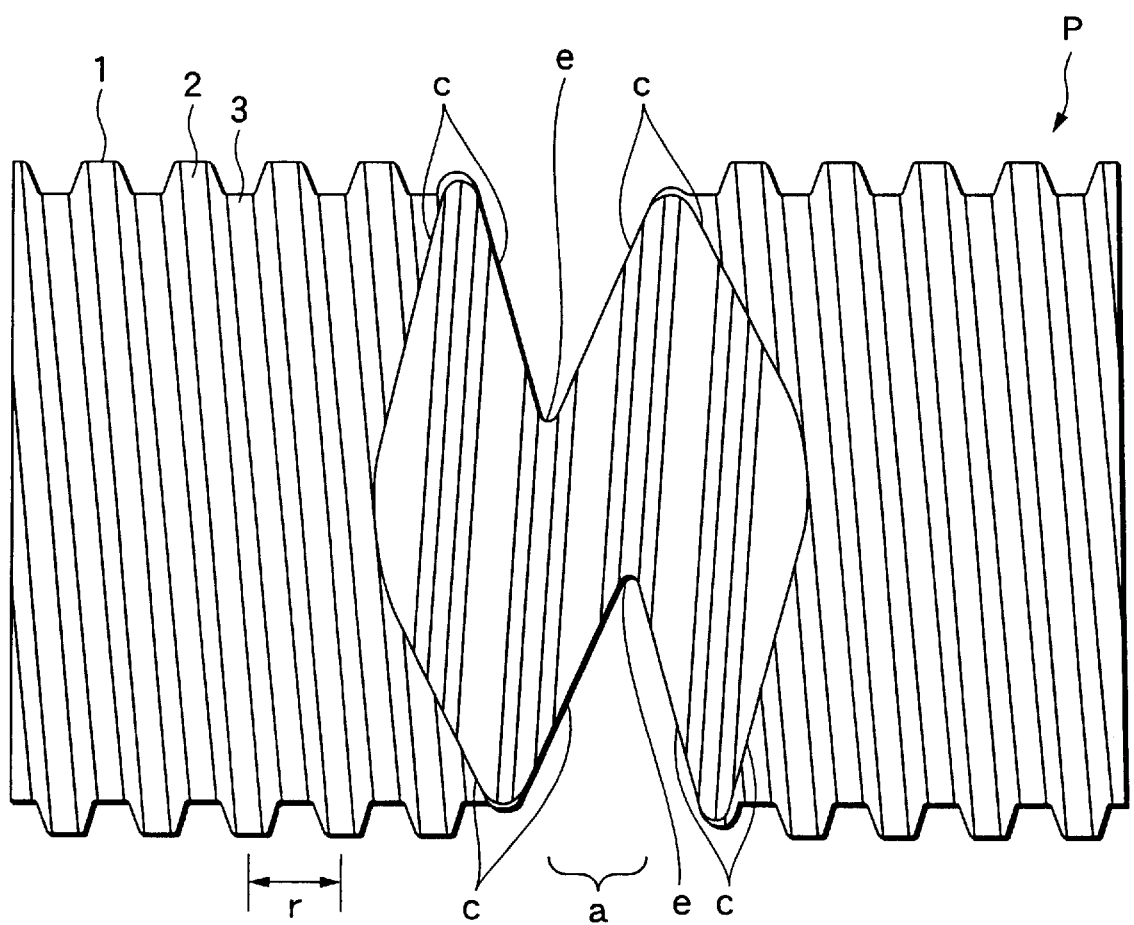
FIG. 8 is a plan view of the elbow shown in FIG. 6, showing a state thereof in which it is under manufacture.
Figure 9:
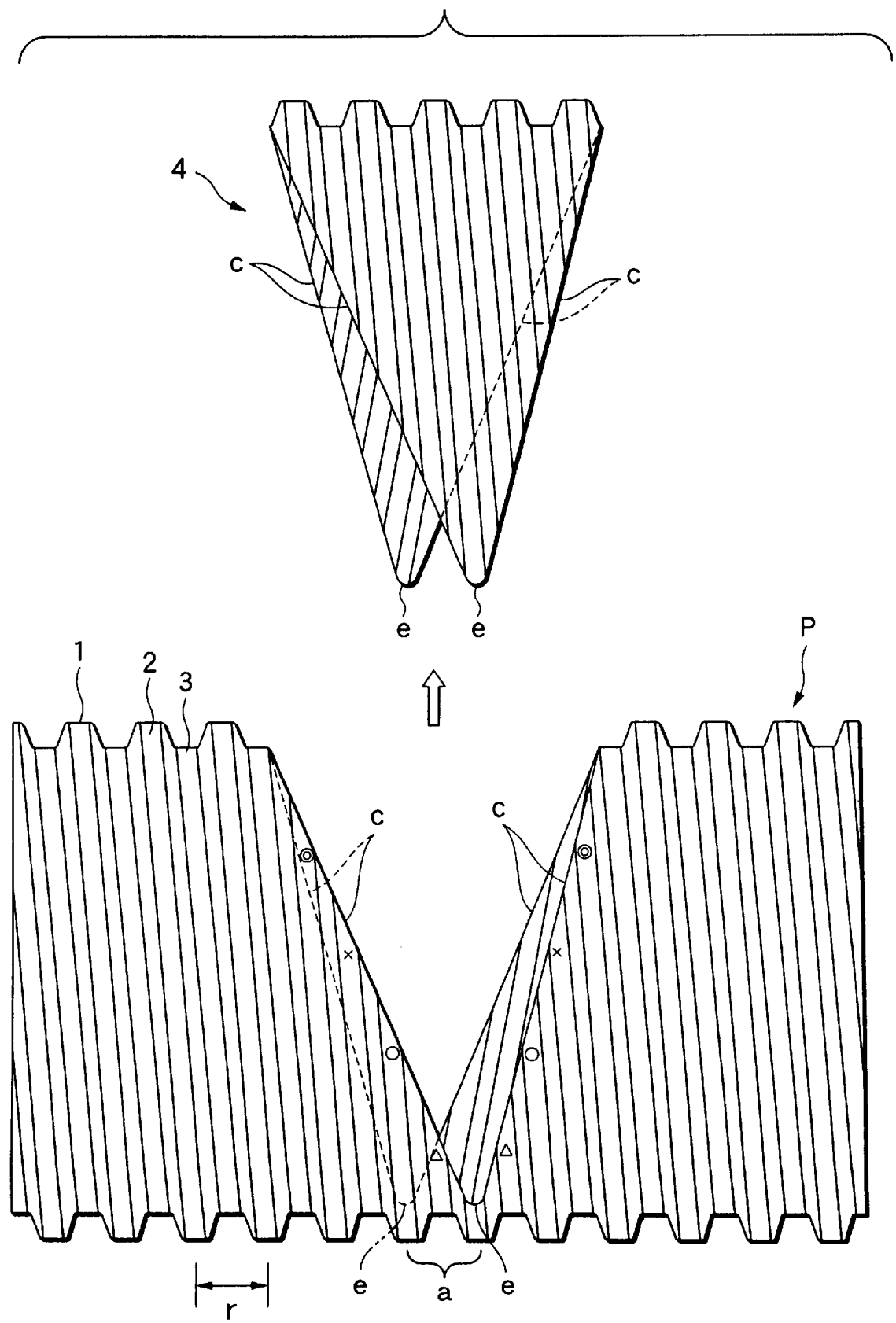
FIG. 9 is a side view of the elbow shown in FIG. 6, showing a state thereof in which it is under manufacture.
Figure 10:
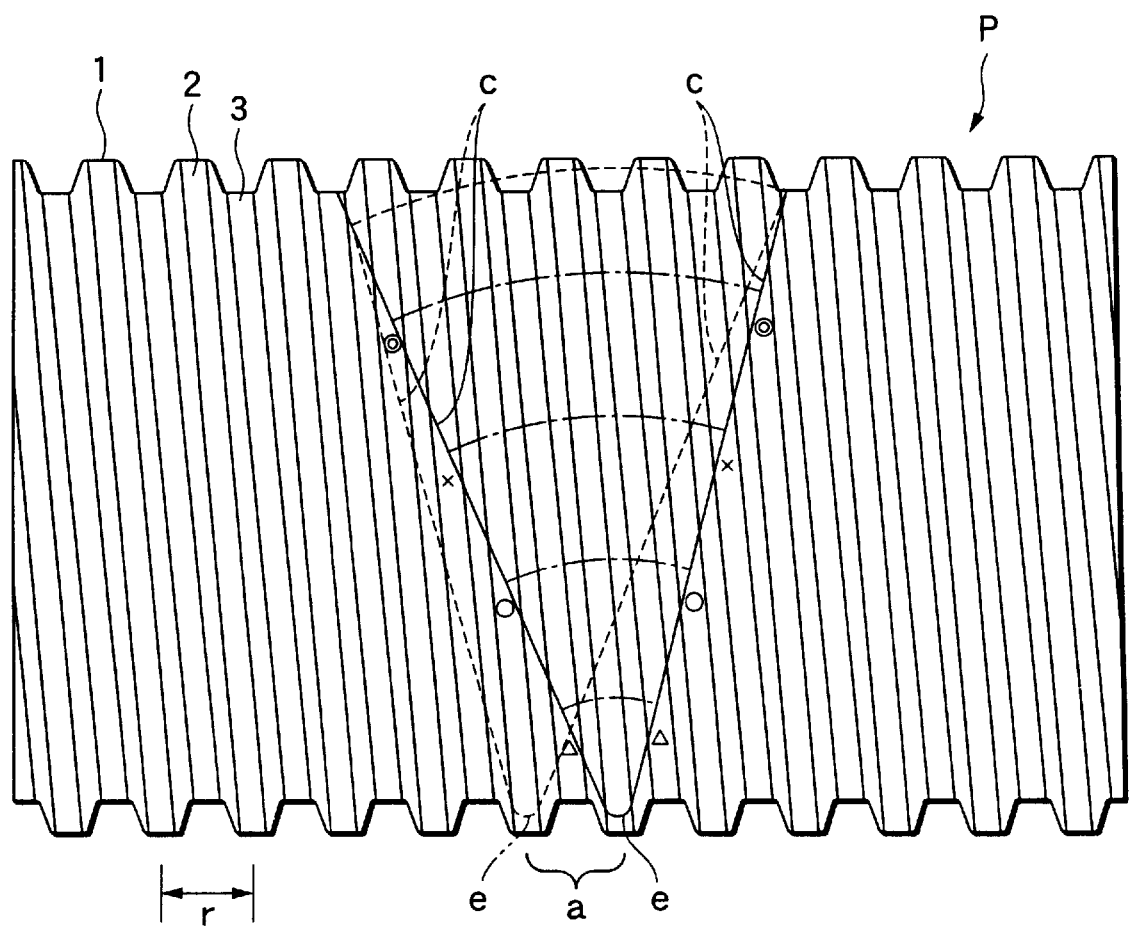
FIG. 10 is a side view of the elbow shown in FIG. 6, showing an initial stage of manufacturing the elbow.
Figure 11:
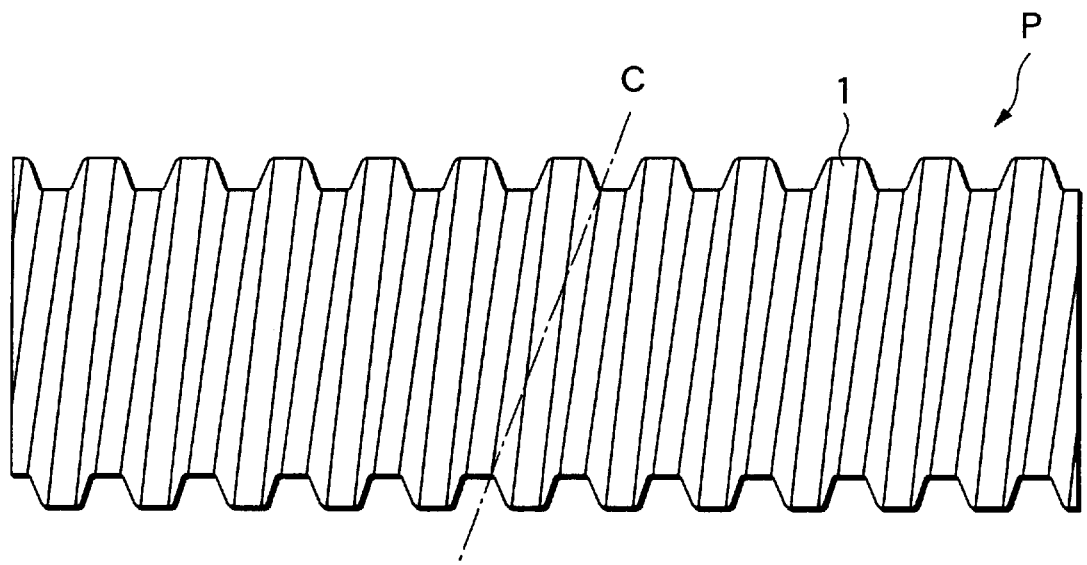
FIG. 11 is a side view of a conventional elbow, explaining means for manufacturing the same.
Figure 12:
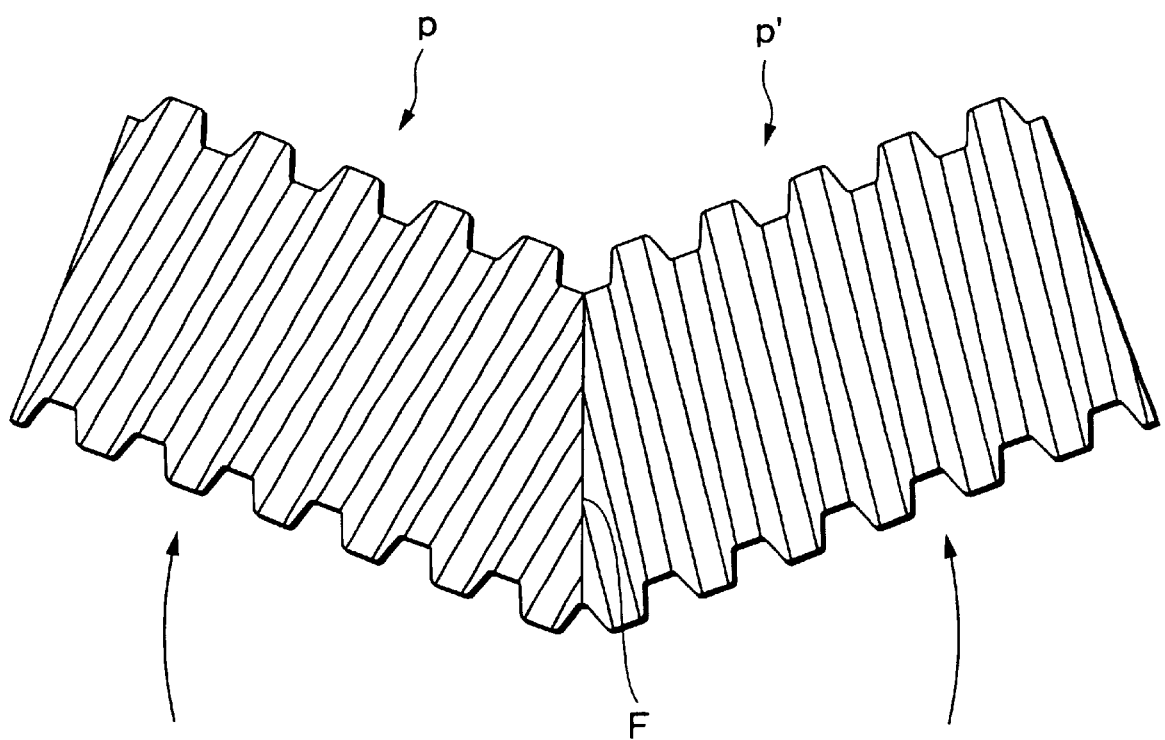
FIG. 12 is a side view of the elbow shown in FIG. 11, showing a state thereof in which it is under manufacture.
Figure 13:
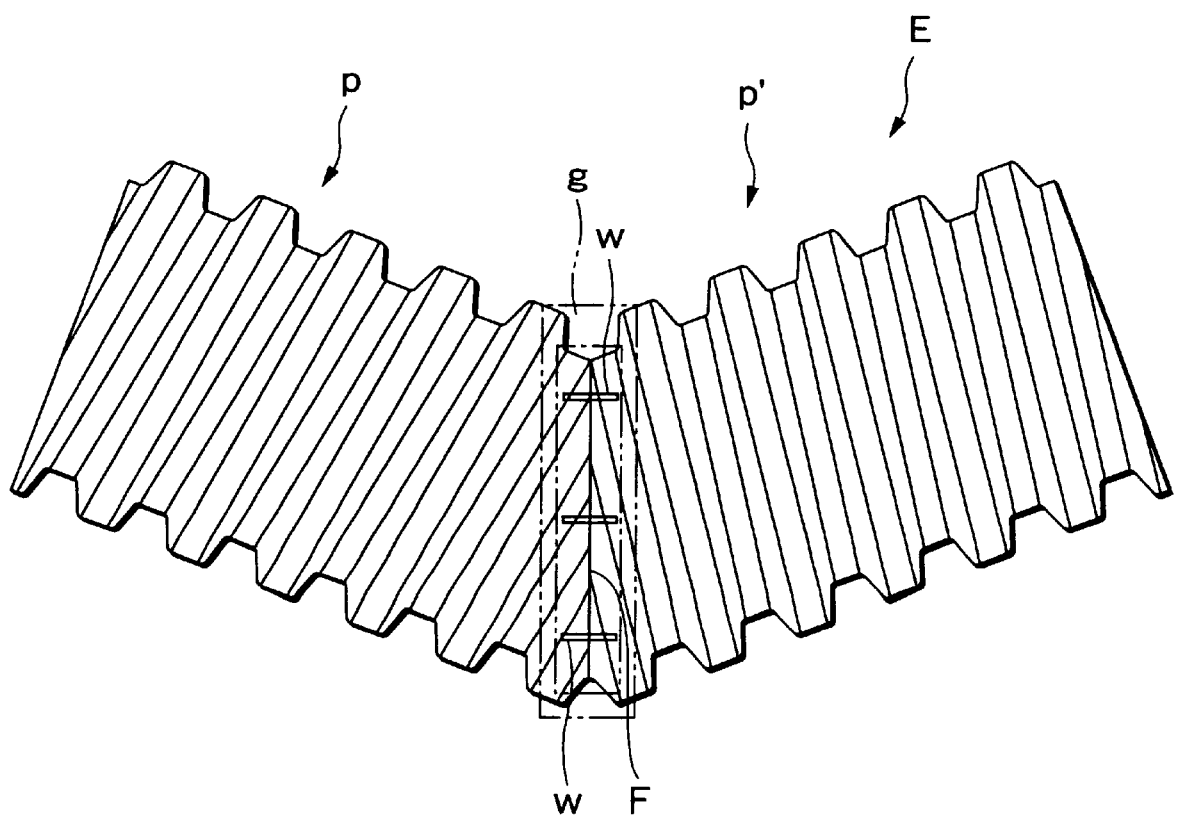
FIG. 13 is a side view of the elbow shown in FIG. 11, showing a completed state thereof.
Figure 14:
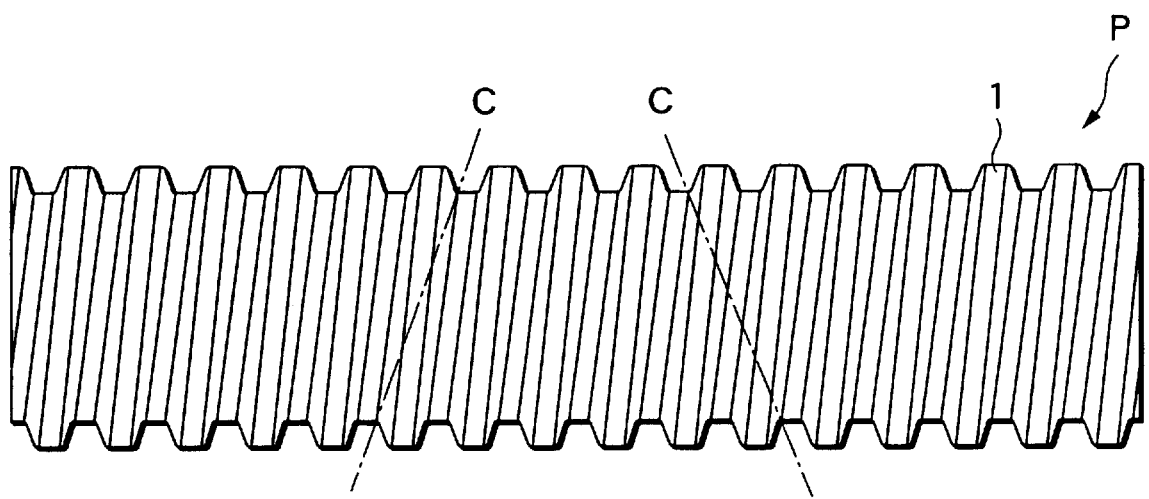
FIG. 14 is a side view of another conventional elbow, explaining means for manufacturing the same.
Figure 15:
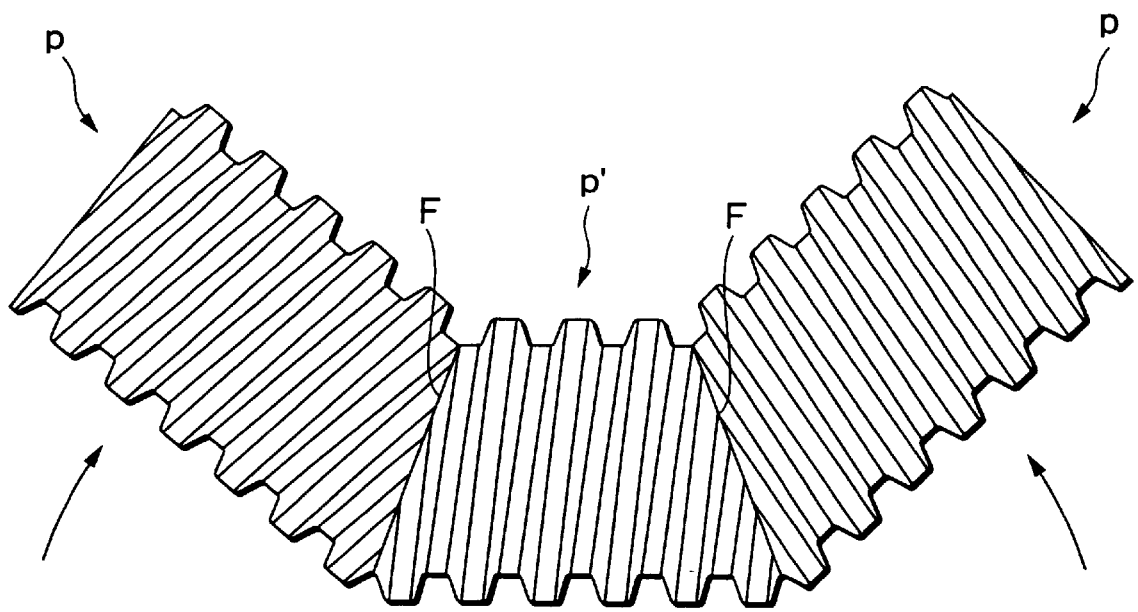
FIG. 15 is a side view of the elbow shown in FIG. 14, showing a state thereof in which it is under manufacture; and, FIG. 16 is a side view of the elbow shown in FIG. 14, showing a completed state thereof.
Figure 16:
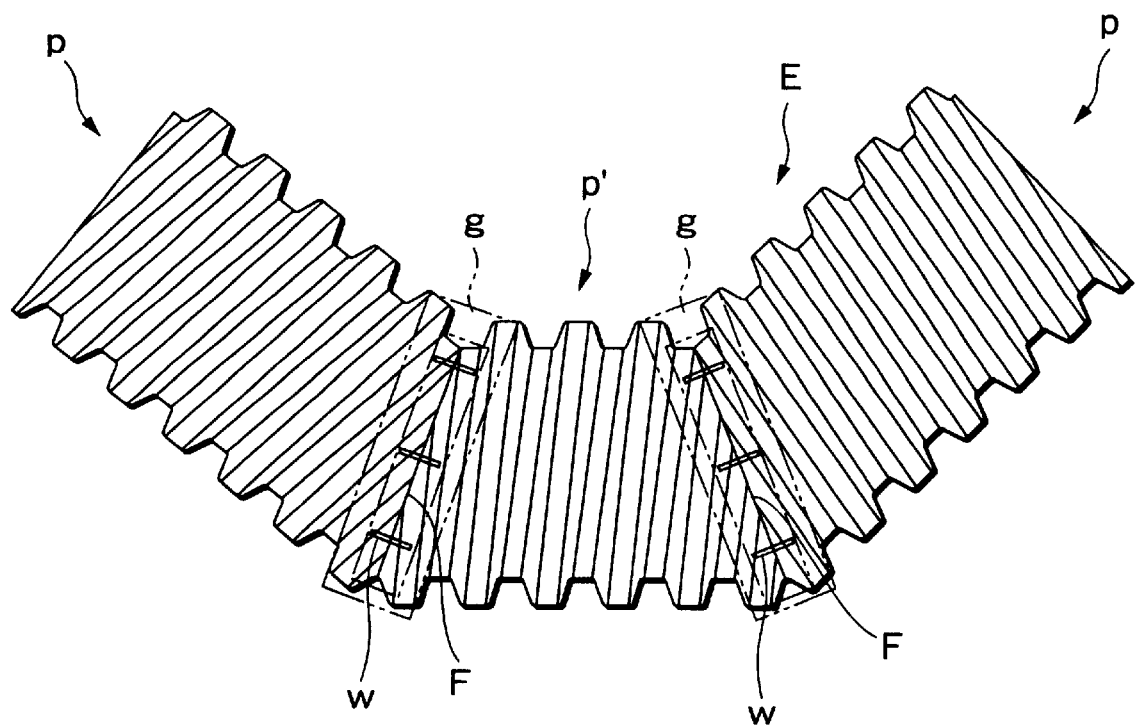

In the case of the elbow E according to the present modification, as shown in FIGS. 6 to 10, in cutting the pipe wall 1 in the bend forming portion shown in the previously described embodiment, the positions of the two cut bottom portions e, e disposed opposed to each other with the pipe wall uncut portion a between them are respectively shifted in the pipe axial direction by an amount almost equivalent to one pitch width r of the spirally corrugated shape of the pipe wall 1; that is, as shown in FIGS. 9 and 10, the bend forming portion of the pipe wall 1 is cut along V-shaped cut lines C which are shifted from each other in the lower portions thereof when they are viewed from their respective side surface sides so that the mutually opposing cut bottom portions e and e are shifted from each other substantially by one pitch width r of the spirally corrugated shape of the pipe wall 1 in the pipe axial direction. Then, the cut portion 4 is removed in such a manner as shown in FIG. 9. The plan shape of the pipe body P with the cut portion 4 removed therefrom, as shown in FIG. 8, substantially provides a combined shape of a first C shape and a second C shape which is obtained by inverting the first C shape in the right and left direction.

In the thus machined pipe body P, with the pipe wall uncut portion a set on the large diameter side, the two side portions of the pipe body P respectively existing on the two sides of the pipe wall uncut portion a are respectively bent in such a manner as to not only match substantially the crown portions 2 and 2 of the spirally corrugated shapes of the cut surfaces c and c to each other but also match substantially the valley portions 3 and 3 thereof to each other, and, in this state, the cut surfaces c and c are contacted with each other. That is, as shown in FIG. 7, the crown portions of the pipe wall 1 designated by reference marks ⊚ and ⊚, the crown portions of the pipe wall 1 designated by ○ and ○, the valley portions of the pipe wall 1 designated by X and X, and the valley portions of the pipe wall 1 designated by Δ and Δ are substantially matched to each other; and, in this matched state, the cut surfaces c and care contacted with each other. After then, while maintaining this contacted state, similarly to the embodiment shown in FIG. 6, the contact portions t of the cut surfaces c and c are fastened tight by a wire member w such as an iron wire or a stainless steel wire and also the contact portions t of the cut surfaces c and c are connected together in a watertight manner using connecting material m and another coating material s.

In the present modification, as shown in FIG. 6, after the cut portion having a substantially V-like shape when it is viewed from the side surface side thereof is cut and removed from the pipe body P, the contact portions t of the cut surfaces c and c provide vertically inverted V-like shapes when they are viewed from the respective side surface sides thereof; the cut surfaces c and c are contacted with each other in such a manner that the crown portions 2 of the spirally corrugated shapes of the cut surfaces c and c are substantially opposed to each other and the valley portions 3 thereof are also substantially opposed to each other; and, the outer peripheral surfaces of the contact portions t are connected together in a watertight manner by the connecting blank material m, thereby providing an elbow having a bending angle of 45°.

By the way, although description is omitted here of a concrete embodiment, even in the means for manufacturing the elbow E shown in FIG. 6, as has been described in the second embodiment shown FIGS. 4 and 5, it can be easily understood that, by providing two bend forming portions in the pipe body P, there can be obtained an elbow having a bending angle of 90°.

Also, in the above embodiment, the mutually opposed cut bottom portions e and e are shown in such a manner that they respectively terminate in the crown portions of the pipe wall. However, it is not necessary that the cut terminating portions, that is, the cut bottom portions e and e terminate in the crown portions; but, it goes without saying that they also can terminate in the valley portions respectively.

The elbow E according to the invention is not limited to the elbows respectively having bending angles of 45° and 90° that are shown in the above-mentioned embodiments but, according to the invention, there can be obtained an elbow having an arbitrary bending angle by setting the cutting angle of the cut portion having a substantially V-like shape when it is viewed from the side surface side thereof at an arbitrary angle, for example an angle of 50° or 60°. Also, the structure of the pipe wall 1 is not limited to a pipe body having a single wall structure formed in a spirally corrugated shape, but the present invention can also be applied to a pipe body having a dual wall structure which comprises a corrugated main wall and an inner wall or an outer wall formed inwardly or outwardly of the main wall.

Although description has been given heretofore of the typical embodiments of the invention, the invention is not always limited to the structures of these embodiments but other changes and modifications are also possible provided that they can satisfy the above-mentioned composing requirements of the invention, can attain the object of the invention, and can provide the effects of the invention as follows.

As can be seen clearly from the foregoing description, the elbow according to the invention is not manufactured in such a manner that, after the pipe body serving as the elbow blank material is cut and divided once, the cut surfaces thereof are connected together again in an annular manner over the entire peripheries thereof; but, a portion of the pipe wall is left uncut and remains connected as it is and thus the portion to be connected is only the cut and removed portion of the pipe body having a substantially V-like shape when it is viewed from the side surface side thereof. Therefore, when compared with an elbow manufactured by cutting and dividing the pipe body and then connecting together the cut and divided portions of the pipe body over the entire peripheries thereof, the elbow according to the invention can provide outstanding effects as follows: that is, the present elbow is highly resistant to a tensile load to be applied in the axial direction thereof as well as to a compressive load to be applied in the bending direction thereof; and, it can reduce a fear that, even in case where it is handled roughly, or even in case where the ground pressure is applied to the outer periphery thereof in a biased manner after it is embedded and used in the ground, the connected portions thereof can be destructed to thereby cause a water leak. That is, the present elbow can be used reliably.

Also, in the case of an elbow according to a second aspect of the invention, since the contact portions of the cut surfaces of the present elbow are connected together in a state that the crown portions of the pipe body are substantially matched to each other as well as the valley portions thereof are also substantially matched to each other, vacant spaces to be produced in the contact portions of the cut surfaces can be reduced in size, which can facilitate the mutual connection between the contact portions of the cut surfaces more positively. This can provide an advantage that it is easy to obtain an elbow the connected portions of which are more resistant to a compressive load and a bending load such as the above-mentioned ground pressure.

In the case of the elbow manufacturing method according to the invention, the pipe body serving as the elbow blank member is not cut nor divided, but a portion of the pipe wall of the blank member is left uncut and only the cut surfaces of the V-shaped cut and removed portion of the pipe body are contacted with each other and are then connected together in a watertight manner. Therefore, when compared with an operation to connect together the entire peripheries of the cut and divided pipe body portions, the positioning of the connected portions can be stabilized and secured, which can provide an outstanding effect that an elbow highly resistant to an external bending force and free from easy leakage of water can be manufactured uniformly, easily and quickly.

Also, in the case of an elbow manufacturing method according to another aspect of the invention, since the crown portions of the pipe body are substantially matched to each other as well as the valley portions thereof are also substantially matched to each other, vacant spaces to be produced in the contact portions of the cut surfaces can be reduced in size. This can provide an advantage that an elbow can be manufactured more positively and more quickly.

What is claimed is:

1. A spirally corrugated pipe elbow, wherein, after a bend forming portion of a pipe body (P) having a given length and including a spirally corrugated pipe wall (1) is cut and removed from said pipe body (P) in the form of a cut portion having a substantially V-like shape when it is viewed from a side surface side thereof while a partial portion (a) of said pipe wall (1) existing in the circumferential direction of said pipe body (P) is left uncut, the two cut surfaces of the pipe body (P) are bent and contacted with each other in a state that said uncut partial portion (a) is set on a large diameter side of said elbow, and said contact portions (t) of said cut surfaces are connected together in a watertight manner using connecting material (m).

2. A spirally corrugated pipe elbow as set forth in claim 1, wherein said contact portions (t) are previously tightened and connected together by a wire member (w) at a position inside said connecting material (m).

3. A spirally corrugated pipe elbow as set forth in claim 2, wherein said wire member (w) is a metal wire or a resin wire.

4. A spirally corrugated pipe elbow as set forth in claim 1, wherein the outer peripheral surface of said connecting material (m) used to connect together said contact portions (t) is covered with FRP.

5. A spirally corrugated pipe elbow, wherein a bend forming portion of a pipe body (P) having a given length and including a spirally corrugated pipe wall (1) is cut and removed from said pipe body (P) in the form of a cut portion having a substantially V-like shape when it is viewed from a side surface side thereof while a partial portion (a) of said pipe wall (1) existing in the circumferential direction of said pipe body (P) is left uncut, and the mutually opposing cut bottom portions (e), (e) of said V-shaped portion are cut and removed in such a manner that they are shifted substantially by one pitch width (r) of said pipe wall spiral shape in the axial direction of said pipe body (P) and, after then, the cut surfaces of the pipe body (P) are bent and contacted with each other in a state that said pipe wall uncut portion (a) is set on the large diameter side, the crown portions (2) of the spirally corrugated shape of said cut surfaces are contacted with each other substantially in a mutually opposing manner and the valley portions (3) of said spirally corrugated shape of said cut surfaces are also contacted with each other substantially in a mutually opposing manner, and the outer peripheral surfaces of said contact portions (t) are connected together in a watertight manner using connecting material (m).

6. A spirally corrugated pipe elbow as set forth in claim 5, wherein said contact portions (t) are previously tightened and connected together by a wire member (w) at a position inside said connecting material (m).

7. A spirally corrugated pipe elbow as set forth in claim 6, wherein said wire member (w) is a metal wire or a resin wire.

8. A spirally corrugated pipe elbow as set forth in claim 5, wherein the outer peripheral surface of said connecting material (m) used to connect together said contact portions (t) is covered with FRP.

* * * * *